United States Patent [19]
Adam et al.

[11] Patent Number: 5,958,086
[45] Date of Patent: Sep. 28, 1999

[54] DYE MIXTURES, PROCESS FOR THEIR PREPARATION AND THE USE THEREOF

[75] Inventors: Jean-Marie Adam, Rosenau, France; Rudolf Hurter, Basel, Switzerland

[73] Assignee: Ciba Specialty Chemicals Corporation, Tarrytown, N.Y.

[21] Appl. No.: 08/918,884

[22] Filed: Aug. 26, 1997

[51] Int. Cl.$^6$ .............................. D06P 1/06; D06P 1/382; D06P 3/06; D06P 3/10

[52] U.S. Cl. .......................... 8/641; 8/643; 8/917; 8/924; 8/549

[58] Field of Search ................................. 8/638–643, 688, 8/692, 917, 924, 549, 696

[56] References Cited

U.S. PATENT DOCUMENTS

| | | |
|---|---|---|
| 3,488,343 | 1/1970 | de Montmollin et al. ............. 260/199 |
| 4,185,959 | 1/1980 | Imada et al. . |
| 4,652,269 | 3/1987 | Bowles et al. . |
| 5,232,462 | 8/1993 | Tzikas ......................................... 8/549 |
| 5,456,727 | 10/1995 | Heimling et al. . |
| 5,496,381 | 3/1996 | Russ et al. . |
| 5,541,301 | 7/1996 | Jordine et al. .......................... 534/635 |
| 5,556,435 | 9/1996 | Russ et al. . |
| 5,644,040 | 7/1997 | Hurter ..................................... 534/635 |
| 5,653,773 | 8/1997 | Reddig et al. .............................. 8/532 |
| 5,693,103 | 12/1997 | Van Chambers et al. . |
| 5,735,911 | 4/1998 | Tzikas ......................................... 8/547 |
| 5,779,740 | 7/1998 | Lehmann et al. .......................... 8/549 |

FOREIGN PATENT DOCUMENTS

| | | |
|---|---|---|
| 0657508 | 6/1995 | European Pat. Off. . |
| 0714955 | 6/1996 | European Pat. Off. . |
| 2226336 | 6/1990 | United Kingdom . |

OTHER PUBLICATIONS

C.L. Bird, "The Theory and Practice of Wool Dyeing", The Society of Dyers and Colourists, Yorkshire 1972, p. 79.

K. Venkataraman, "The Chemistry of Synthetic Dyes", vol. 7, p. 93. 1974.

Primary Examiner—Margaret Einsmann
Attorney, Agent, or Firm—Jacob M. Levine; Kevin T. Mansfield; David R. Crichton

[57] ABSTRACT

Dye mixtures, which comprise at least one dye of formula (1)

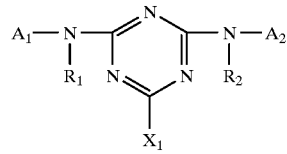

and at least one dye of formulae (2) and (3)

(2)

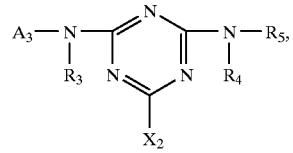

(3)

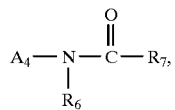

wherein $R_1$, $R_2$, $R_3$, $R_4$, $R_5$, $R_6$, $R_7$, $X_1$, $X_2$, $A_1$, $A_2$, $A_3$ and $A_4$ are as defined in claim 1.

The dye mixtures according to this invention are particularly suitable for dyeing or printing natural or synthetic polyamide fiber material.

7 Claims, No Drawings

DYE MIXTURES, PROCESS FOR THEIR PREPARATION AND THE USE THEREOF

The present invention relates to novel dye mixtures, to a process for their preparation and the to use of these dye mixtures for dyeing and printing fibre materials, in particular textile fibre materials.

This invention relates to dye mixtures which comprise at least one dye of formula

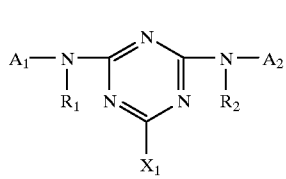

(1)

and at least one dye of formulae (2) and (3)

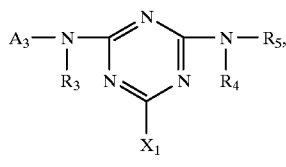

(2)

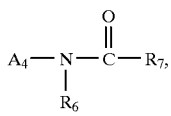

(3)

wherein $R_1$, $R_2$, $R_3$, $R_4$ and $R_6$ are each independently of one another hydrogen or unsubstituted or substituted $C_1$–$C_4$alkyl, $R_5$ is hydrogen, or unsubstituted or substituted $C_1$–$C_6$alkyl, $C_5$–$C_7$cycloalkyl, or phenyl or naphthyl which are unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z, or the radical of formula —$N(R_4)$—$R_5$ is a ring which may contain further hetero atoms, wherein Z is a group of formula —CH=$CH_2$ or —$CH_2$—$CH_2$—Y, and Y is a leaving group, $R_7$ is unsubstituted or substituted $C_1$–$C_6$alkyl, $C_2$–$C_4$alkenyl, phenyl or naphthyl, $X_1$ and $X_2$ are each independently of the other halogen, hydroxyl, $C_1$–$C_4$alkoxy, $C_1$–$C_4$alkylthio, amino; N-mono- or N,N-di-$C_1$–$C_4$alkylamino which may be substituted in the alkyl moiety, or $C_5$–$C_7$cycloalkylamino which may be substituted in the cycloalkyl ring, or phenylamino or N—$C_1$–$C_4$alkyl-N-phenylamino which may be substituted in the aryl moiety, morpholino or piperidin-1-yl, and $A_1$, $A_2$, $A_3$ and $A_4$ are each independently of the other radicals of a monoazo, diazo, polyazo, metal complex azo, anthraquinone, formazan, phthalocyanine or dioxazine dye.

Suitable $R_1$, $R_2$, $R_3$, $R_4$ and $R_6$ defined as $C_1$–$C_4$alkyl are, each independently of one another, typically methyl, ethyl, propyl, isopropyl, butyl, sec-butyl, tert-butyl or isobutyl. The cited alkyl radicals may be unsubstituted or substituted by e.g. hydroxy, sulfo, sulfato, cyano or carboxyl. The corresponding unsubstituted alkyl radicals are preferred.

$C_1$–$C_6$Alkyl $R_5$ may suitably be e.g. pentyl, hexyl and, preferably, $C_1$–$C_4$alkyl radicals, such as methyl, ethyl, propyl, isopropyl, butyl, sec-butyl, tert-butyl or isobutyl. The cited alkyl radicals can be unsubstituted or substituted by e.g. hydroxy, sulfo, sulfato, cyano or carboxyl.

$C_5$–$C_7$Cycloalkyl $R_5$ is suitably the cyclopentyl, cycloheptyl and, preferably, the cyclohexyl radical. The cited cycloalkyl radicals can be unsubstituted or substituted by e.g. $C_1$–$C_4$alkyl, preferably by methyl.

$R_5$ defined as phenyl radical or naphthyl radical can be unsubstituted or substituted by $C_1$–$C_4$alkyl, such as methyl, ethyl, propyl, isopropyl, butyl, sec-butyl, tert-butyl or isobutyl, preferably methyl or ethyl; $C_1$–$C_4$alkoxy, such as methoxy, ethoxy, propoxy, isopropoxy, butoxy, sec-butoxy, isobutoxy or tert-butoxy, preferably methoxy or ethoxy; $C_2$–$C_4$alkanoylamino, such as acetylamino, propionylamino or butyrylamino, preferably acetylamino; carboxyl; sulfo; carbamoyl; ureido; halogen, such as fluoro, chloro, bromo; or by a radical of formula —$SO_2$—Z.

The radical of formula —$N(R_4)$—$R_5$ defined as a ring which may contain additional hetero atoms is typically piperidin-1-yl, piperazin-1-yl and, preferably, morpholino.

Z is suitably a group of formula —CH=$CH_2$ or —$CH_2$—$CH_2$—Y, preferably of —$CH_2$—$CH_2$—Y.

Y is typically —Cl, —$OSO_3H$, —$SSO_3H$, —OCO—$CH_3$, —OCO—$C_6H_5$ or —$OPO_3H_2$, in particular a group of formula —Cl or —$OSO_3H$ and, preferably, a group of formula —$OSO_3H$.

$C_1$–$C_6$Alkyl $R_7$ is suitably e.g. pentyl, hexyl and, preferably, $C_1$–$C_4$alkyl radicals, such as methyl, ethyl, propyl, isopropyl, butyl, sec-butyl, tert-butyl or isobutyl. The cited alkyl radicals can be unsubstituted or substituted by e.g. $C_1$–$C_4$alkoxy, typically methoxy, ethoxy, propoxy, isopropoxy, butoxy, sec-butoxy, isobutoxy or tert-butoxy, preferably methoxy or ethoxy; $C_2$–$C_4$alkanoyloxy, such as acetyloxy, propionyloxy or butyryloxy; $C_2$–$C_4$alkanoylamino, such as acetylamino, propionylamino or butyrylamino; amino; hydroxyl; halogen, such as fluoro, chloro or bromo; or carboxyl.

$C_2$–$C_4$Alkenyl $R_7$ is typically vinyl, 1-propenyl, allyl, 1-butenyl, 2-butenyl and, preferably, vinyl. The cited alkenyl radicals can be unsubstituted or substituted by e.g. $C_1$–$C_4$alkyl, such as methyl, ethyl, propyl, isopropyl, butyl, sec-butyl, tert-butyl or isobutyl; halogen, such as fluoro, chloro or bromo; or hydroxyl.

$R_7$ defined as phenyl radical or naphthyl radical can be unsubstituted or substituted by e.g. $C_1$–$C_4$alkyl, such as methyl, ethyl, propyl, isopropyl, butyl, sec-butyl, tert-butyl or isobutyl, preferably methyl or ethyl; $C_1$–$C_4$alkoxy, such as methoxy, ethoxy, propoxy, isopropoxy, butoxy, sec-butoxy, isobutoxy or tert-butoxy, preferably methoxy or ethoxy; $C_2$–$C_4$alkanoylamino, such as acetylamino, propionylamino or butyrylamino, preferably acetylamino; carboxyl; hydroxyl; sulfo; carbamoyl; ureido and halogen, such as fluoro, chloro or bromo.

$X_1$ and $X_2$ defined as halogen are each independently of the other typically fluoro, chloro or bromo, preferably chloro.

$X_1$ and $X_2$ defined each independently of the other as $C_1$–$C_4$alkoxy are typically methoxy, ethoxy, propoxy, isopropoxy, butoxy, sec-butoxy, isobutoxy or tert-butoxy, preferably methoxy or ethoxy.

$X_1$ and $X_2$ defined each independently of the other as $C_1$–$C_4$alkylthio are typically methylthio, ethylthio, propylthio, isopropylthio or butylthio.

$X_1$ and $X_2$ defined each independently of the other as N-mono- or N,N-di-$C_1$–$C_4$alkylamino are, for example, N-methylamino, N-ethylamino, N-propylamino, N,N-dimethylamino or N,N-diethylamino. The cited radicals can be unsubstituted or substituted in the alkyl moiety, typically by $C_2$–$C_4$alkanoylamino, such as acetylamino, propionylamino or butyrylamino, preferably acetylamino; $C_1$–$C_4$alkoxy, such as methoxy, ethoxy, propoxy, isopropoxy, butoxy, sec-butoxy, isobutoxy or tert-butoxy, preferably methoxy or ethoxy; hydroxyl, sulfo or carboxyl. Examples to be mentioned of radicals substituted in the alkyl moiety are N-β-hydroxyethylamino and N,N,-di-β-hydroxyethylamino.

$X_1$ and $X_2$ defined each independently of the other as $C_5$–$C_7$cycloalkylamino may include the unsubstituted radicals as well as those which are substituted in the cycloalkyl ring, e.g. by $C_1$–$C_4$alkyl, such as methyl or ethyl, preferably methyl. Preferred radicals are the corresponding cyclohexyl radicals.

$X_1$ and $X_2$ defined each independently of the other as phenylamino or N—$C_1$–$C_4$alkyl-N-phenylamino, preferably phenylamino, may include the unsubstituted radicals as well as those radicals which are substituted in the phenyl ring e.g. by $C_1$–$C_4$alkyl, such as methyl or ethyl; $C_1$–$C_4$alkoxy, such as methoxy, ethoxy; carboxyl; sulfo or halogen, such as fluoro, chloro or bromo.

$R_1$, $R_2$, $R_3$, $R_4$ and $R_6$ are preferably each independently of one another hydrogen or $C_1$–$C_4$-alkyl. $R_1$, $R_2$, $R_3$ and $R_6$ are particularly preferably hydrogen, methyl or ethyl, more particularly hydrogen. $R_4$ is particularly preferably $C_1$–$C_4$alkyl, more particularly methyl or ethyl and, preferably, ethyl.

$R_5$ is preferably unsubstituted $C_1$–$C_6$alkyl, unsubstituted or $C_1$–$C_4$alkyl-substituted $C_5$–$C_7$cycloalkyl, or phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z.

$R_5$ is particularly preferably phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z, more particularly unsubstituted or sulfo- or carboxyl-substituted phenyl.

$R_7$ is preferably $C_1$–$C_4$alkyl which is unsubstituted or substituted by $C_1$–$C_4$alkoxy, $C_2$–$C_4$-alkanoyloxy, $C_2$–$C_4$alkanoylamino, amino, halogen, hydroxyl or carboxyl, or $C_2$–$C_4$alkenyl which is unsubstituted or substituted by $C_1$–$C_4$alkyl, hydroxyl or halogen, or phenyl or naphthyl which are unsubstituted or substituted by $C_1$–$C_4$alkyl, $C_1$–$C_4$alkoxy, $C_2$–$C_4$alkanoylamino, carboxyl, hydroxyl, sulfo, carbamoyl, ureido, halogen.

$R_7$ is particularly preferably a radical of formula —CHX—$CH_2$X or —CX=$CH_2$, wherein X is halogen, such as fluoro, chloro or bromo, preferably bromo.

$X_1$ and $X_2$ are each independently of the other preferably halogen, amino; N-mono- or N,N-di-$C_1$–$C_4$alkylamino which may be substituted in the alkyl moiety by hydroxyl, sulfo, carboxyl, $C_2$–$C_4$alkanoylamino or $C_1$–$C_4$alkoxy, or $C_5$–$C_7$cycloalkylamino which may be substituted in the cycloalkyl ring by $C_1$–$C_4$alkyl, or phenylamino or N—$C_1$–$C_4$alkyl-N-phenylamino which may be substituted in the phenyl ring by $C_1$–$C_4$alkyl, $C_1$–$C_4$alkoxy, carboxyl, sulfo or halogen; morpholino or piperidin-1-yl.

$X_1$ and $X_2$ are each independently of the other particularly preferably halogen; N-mono- or N,N-di-$C_1$–$C_4$alkylamino which may be substituted in the alkyl moiety by hydroxyl; cyclohexylamino, phenylamino, morpholino or piperidin-1-yl and, most preferably halogen.

$X_1$ and $X_2$ are each independently of the other very particularly preferably morpholino, piperidin-1-yl or halogen.

$X_1$ and $X_2$ are very particularly preferably halogen and, most preferably, chloro.

$A_1$, $A_2$, $A_3$ and $A_4$ may carry the customary substituents of organic dyes bound to their basic structure.

Typical examples of substituents in $A_1$, $A_2$, $A_3$ and $A_4$ are: alkyl groups of 1 to 4 carbon atoms, such as methyl, ethyl, propyl, isopropyl or butyl, wherein the alkyl radicals may be further substituted by e.g. hydroxyl, sulfo or sulfato; alkoxy groups of 1 to 4 carbon atoms, such as methoxy, ethoxy, propoxy, isopropoxy or butoxy, wherein the alkyl radicals may be further substituted by e.g. hydroxyl, sulfo or sulfato; phenyl which is unsubstituted or substituted by $C_1$–$C_4$alkyl, $C_1$–$C_4$alkoxy, halogen, carboxyl or sulfo; acylamino groups of 1 to 8 carbon atoms; preferably alkanoylamino groups such as acetylamino or propionylamino; the acylamino groups may be substituted in the alkyl moiety by hydroxyl or $C_1$–$C_4$alkoxy; benzoylamino which may be substituted in the phenyl ring by $C_1$–$C_4$alkyl, $C_1$–$C_4$alkoxy, halogen or sulfo; phenylamino which may be substituted in the phenylring by $C_1$–$C_4$alkyl, $C_1$–$C_4$alkoxy, halogen or sulfo; N,N-di-β-hydroxyethylamino; N,N-di-β-sulfatoethylamino; alkylsulfonyl of 1 to 4 carbon atoms, such as methylsulfonyl or ethylsulfonyl; trifluoromethyl; nitro; amino; cyano; halogen, such as fluoro, chloro or bromo; carbamoyl; sulfamoyl; N-mono- or N,N-dialkylsulfamoyl of 1 to 4 carbon atoms each; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo.

$A_1$, $A_2$, $A_3$ and $A_4$ defined each independently of one another as radicals of a dye are radicals of formula (4)

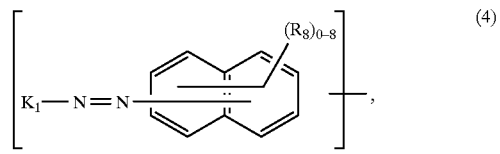

wherein $(R_8)_{0-3}$ is 0 to 3 identical or different substituents selected from the group consisting of $C_1$–$C_4$alkyl, $C_1$–$C_4$alkoxy; $C_2$–$C_4$alkanoylamino which may be substituted in the alkyl moiety by hydroxyl or $C_1$–$C_4$alkoxy; halogen, hydroxyl, cyano, carbamoyl, carboxyl, sulfo, amino, ureido and N-mono- or N,N-di-$C_1$–$C_4$alkylamino, and $K_1$ is a radical of the benzene or naphthalene series or a heterocyclic radical;

or radicals of formula (5)

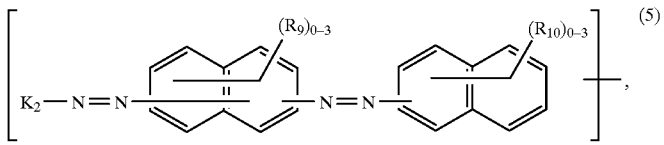

wherein $(R_9)_{0-3}$ and $(R_{10})_{0-3}$ are each independently of the other 0 to 3 identical or different substituents selected from the group consisting of $C_1$–$C_4$alkyl, $C_1$–$C_4$alkoxy; $C_2$–$C_4$alkanoylamino which may be substituted in the alkyl moiety by hydroxyl or $C_1$–$C_4$alkoxy; halogen, hydroxyl, cyano, carbamoyl, carboxyl, sulfo, amino, ureido and N-mono- or N,N-di-$C_1$–$C_4$-alkylamino, and $K_2$ is a radical of the benzene or naphthalene series or a heterocyclic radical;

or radicals of formula (6)

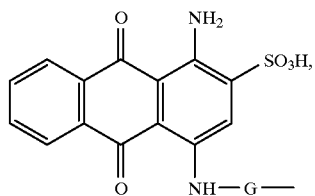

wherein

G is a phenylene radical which is unsubstituted or substituted by $C_1$–$C_4$alkyl, such as methyl or ethyl; $C_1$–$C_4$alkoxy, such as methoxy or ethoxy; $C_2$–$C_4$alkanoylamino, such as acetylamino or propionylamino; halogen, such as fluoro, chloro or bromo; carboxyl; sulfo or ureido, or a cyclohexylene, phenylenmethylene or $C_2$–$C_6$alkylene radical, such as ethylene, propylene, butylene, pentylene or hexylene.

$R_8$, $R_9$ and $R_{10}$ defined as $C_1$–$C_4$alkyl are each independently of one another suitably e.g. methyl, ethyl, propyl, isopropyl, butyl, sec-butyl, tert-butyl or isobutyl, preferably methyl and ethyl. The other $C_1$–$C_4$alkyl substituents cited hereinafter have the same meanings and preferred meanings.

$R_8$, $R_9$ and $R_{10}$ defined as $C_1$–$C_4$alkoxy are each independently of one another suitably e.g. methoxy, ethoxy, propoxy, isopropoxy, butoxy, sec-butoxy, isobutoxy or tert-butoxy, preferably methoxy or ethoxy. The other $C_1$–$C_4$alkoxy substituents which are cited hereinafter have the same meanings and preferred meanings.

Where $R_8$, $R_9$ and $R_{10}$ are each independently of one another $C_2$–$C_4$alkanoylamino which may be substituted in the alkyl moiety by hydroxyl or $C_1$–$C_4$alkoxy, they are typically acetylamino, propionylamino, β-hydroxyacetylamino or β-methoxyacetylamino.

Where $R_8$, $R_9$ and $R_{10}$ are each independently of one another N-mono- or N,N-di-$C_1$–$C_4$alkylamino, they are suitably e.g. N-methylamino, N-ethylamino, N-propylamino, N,N-di-methylamino or N,N-di-ethylamino. These examples are cited as representatives of all other substituents defined as N-mono- or N,N-di-$C_1$–$C_4$alkylamino.

Where $R_8$, $R_9$ and $R_{10}$ are each independently of one another halogen, they are typically fluoro, chloro or bromo. These examples are cited as representatives of all other substituents defined as halogen.

$A_1$, $A_2$, $A_3$ and $A_4$ defined each independently of one another as radicals of a dye are particularly preferably radicals of formula (7), (8) or (9)

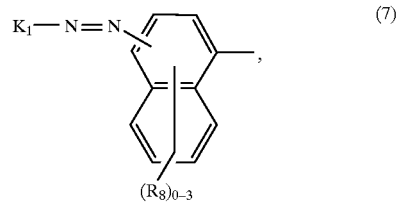

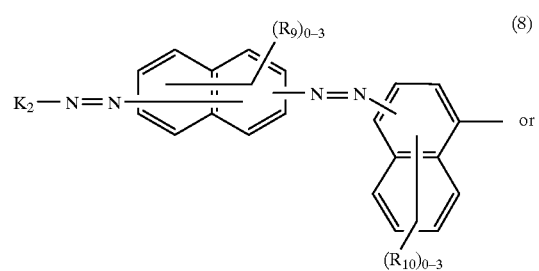

wherein $(R_8)_{0-3}$, $(R_9)_{0-3}$ and $(R_{10})_{0-3}$ are 0 to 3 identical or different substituents selected from the group consisting of $C_1$–$C_4$alkyl, $C_1$–$C_4$alkoxy; $C_2$–$C_4$alkanoylamino which may be substituted in the alkyl moiety by hydroxyl or $C_1$–$C_4$alkoxy; ureido, halogen and sulfo, $(R_{11})_{0-3}$ is 0 to 3 identical or different substituents selected from the group consisting of $C_1$–$C_4$alkyl, $C_1$–$C_4$alkoxy, $C_2$–$C_4$alkanoylamino, halogen, carboxyl, ureido and sulfo, and $K_1$ and $K_2$ are each independently of the other a radical of formula (10)

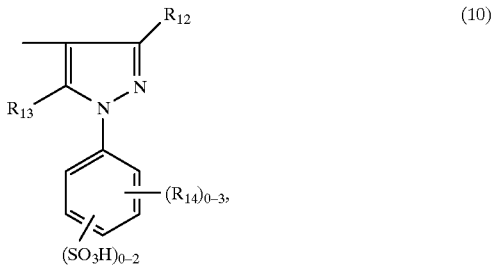

wherein $R_{12}$ is methyl or carboxyl, $R_{13}$ is amino or hydroxyl, and $(R_{14})_{0-3}$ is 0 to 3 identical or different substituents selected from the group consisting of $C_1$–$C_4$alkyl, $C_1$–$C_4$alkoxy, $C_2$–$C_4$alkanoylamino, ureido, halogen, carboxyl and sulfo;

or radicals of formula (11)

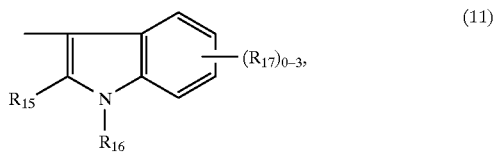

wherein $R_{15}$ is hydrogen, $C_1$–$C_8$alkyl, or phenyl which is unsubstituted or substituted by $C_1$–$C_4$alkyl, $C_1$–$C_4$alkoxy, $C_2$–$C_4$alkanoylamino, ureido, halogen or sulfo, $R_{16}$ is hydrogen or $C_1$–$C_8$alkyl, and $(R_{17})_{0-3}$ is 0 to 3 identical of different substituents selected from the group consisting of $C_1$–$C_4$alkyl, $C_1$–$C_4$alkoxy, $C_2$–$C_4$alkanoylamino, ureido, halogen and sulfo;

or radicals of formula (12)

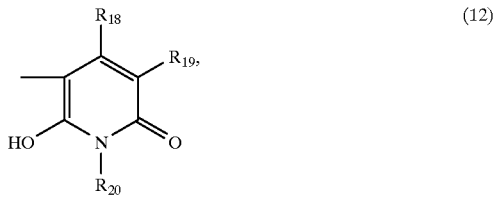

wherein $R_{18}$ is hydrogen or $C_1$–$C_4$alkyl, $R_{19}$ is hydrogen, cyano, carbamoyl or sulfomethyl, and $R_{20}$ is hydrogen, $C_1$–$C_4$alkyl, or phenyl which is unsubstituted or substituted by $C_1$–$C_4$alkyl, $C_1$–$C_4$alkoxy, $C_2$–$C_4$alkanoylamino, ureido, halogen or sulfo;

or radicals of formula (13)

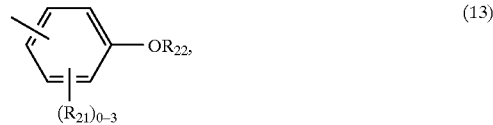

wherein $(R_{21})_{0-3}$ is 0 to 3 identical or different substituents selected from the group consisting of $C_1$–$C_4$alkyl, $C_1$–$C_4$alkoxy, $C_2$–$C_4$alkanoylamino, ureido, halogen and sulfo, and $R_{22}$ is hydrogen or unsubstituted or hydroxyl-substituted $C_1$–$C_4$alkyl;

or radicals of formula (14)

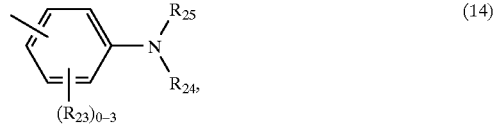

wherein $(R_{23})_{0-3}$ are 0 to 3 identical or different substituents selected from the group consisting of $C_1$–$C_4$alkyl, $C_1$–$C_4$alkoxy, $C_2$–$C_4$alkanoylamino, ureido, halogen and sulfo, and $R_{24}$ and $R_{25}$ are each independently of the other hydrogen, or $C_1$–$C_4$alkyl which is unsubstituted or substituted by cyano, hydroxyl, phenyl or $C_5$–$C_7$cycloalkyl, wherein the phenyl radical is unsubstituted or substituted by $C_1$–$C_4$alkyl, $C_1$–$C_4$alkoxy, $C_2$–$C_4$alkanoylamino, ureido, halogen or sulfo and the $C_5$–$C_7$cycloalkyl radical is unsubstituted or $C_1$–$C_4$alkyl-substituted, or phenyl which is unsubstituted or substituted by $C_1$–$C_4$alkyl, $C_1$–$C_4$alkoxy, $C_2$–$C_4$alkanoylamino, ureido, halogen, carboxyl, hydroxyl or sulfo;

or radicals of formula (15)

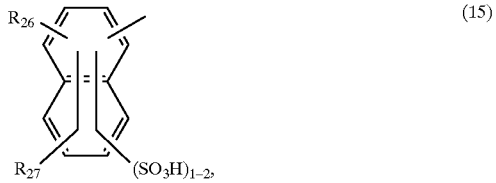

wherein $R_{26}$ is hydrogen, amino, N-mono- or N,N-di-$C_1$–$C_4$alkylamino, or phenylamino which may be substituted in the phenyl ring by $C_1$–$C_4$alkyl, $C_1$–$C_4$alkoxy, $C_2$–$C_4$alkanoylamino, ureido, halogen or sulfo, and $R_{27}$ is hydrogen, $C_1$–$C_4$alkyl, $C_1$–$C_4$alkoxy, $C_2$–$C_4$alkanoylamino, ureido, halogen or hydroxyl.

Where $R_{11}$, $R_{14}$, $R_{17}$, $R_{21}$, $R_{23}$ and $R_{27}$ are each independently of one another $C_2$–$C_4$alkanoylamino, they are suitably acetylamino, propionylamino or butyrylamino, preferably acetylamino.

Suitable $C_1$–$C_8$alkyl $R_{15}$ and $R_{16}$ are typically pentyl, hexyl, heptyl, octyl and, preferably, $C_1$–$C_4$-alkyl radicals, such as methyl, ethyl, propyl, isopropyl, butyl, sec-butyl, tert-butyl or isobutyl, more preferably methyl or ethyl.

$R_{15}$ and $R_{20}$ defined each independently of the other as phenyl radical may be unsubstituted or substituted by $C_1$–$C_4$alkyl, typically methyl, ethyl, propyl, isopropyl, butyl, sec-butyl, tert-butyl or isobutyl, preferably methyl or ethyl; $C_1$–$C_4$alkoxy, such as methoxy, ethoxy, propoxy, isopropoxy, butoxy, sec-butoxy, isobutoxy or tert-butoxy, preferably methoxy or ethoxy; $C_2$–$C_4$alkanoylamino, such as acetylamino, propionylamino or butyrylamino, preferably acetylamino; ureido; sulfo or halogen, such as fluoro, chloro or bromo.

$R_{22}$ defined as $C_1$–$C_4$alkyl, such as methyl, ethyl or propyl, is unsubstituted or hydroxyl-substituted.

$R_{24}$ and $R_{25}$ defined each independently of the other as $C_1$–$C_4$alkyl, such as methyl, ethyl or propyl, is unsubstituted or substituted by cyano, hydroxyl, phenyl or $C_5$–$C_7$cycloalkyl, such as cyclopentyl or cyclohexyl, preferably cyclohexyl. The phenyl radical may be unsubstituted or substituted by $C_1$–$C_4$alkyl, such as methyl or ethyl; $C_1$–$C_4$alkoxy, such as methoxy or ethoxy; $C_2$–$C_4$alkanoylamino, such as acetylamino; ureido; sulfo or halogen, such as fluoro, chloro or bromo. The $C_5$–$C_7$cycloalkyl radical may be unsubstituted or substituted by $C_1$–$C_4$alkyl, such as methyl or ethyl, preferably methyl.

$R_{26}$ defined as phenylamino can be unsubstituted or substituted in the phenyl ring by $C_1$–$C_4$-alkyl, such as methyl or ethyl; $C_1$–$C_4$alkoxy, such as methoxy or ethoxy; $C_2$–$C_4$alkanoylamino, such as acetylamino; ureido; sulfo or halogen, such as fluoro, chloro or bromo.

$A_1$, $A_2$, $A_3$ and $A_4$ defined each independently of one another as radicals of a dye are very particularly preferably radicals of formula (16)

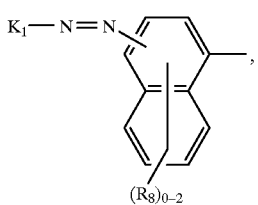

or (9), wherein $(R_8)_{0-2}$ is 0 to 2 identical or different substituents selected from the group consisting of $C_1$–$C_4$alkyl, $C_1$–$C_4$alkoxy, $C_2$–$C_4$alkanoylamino, ureido and sulfo, $(R_{11})_{0-3}$ are 0 to 3 identical or different substituents selected from the group consisting of $C_1$–$C_4$alkyl, $C_1$–$C_4$alkoxy and halogen, preferably 0 to 3 identical or different $C_1$–$C_4$alkyl substiuents and, more preferably, methyl, and $K_1$ is a radical of formula (17)

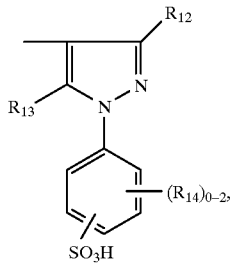

wherein $R_{12}$ is methyl or carboxyl, preferably methyl, $R_{13}$ is amino or hydroxyl, and $(R_{14})_{0-2}$ is 0 to 2 identical or different substituents selected from the group consisting of $C_1$–$C_4$alkyl, $C_1$–$C_4$alkoxy, $C_2$–$C_4$alkanoylamino, ureido, halogen and sulfo and, preferably, 0 to 2 identical or different halogen atoms, in particular chloro;

or radicals of formula (18)

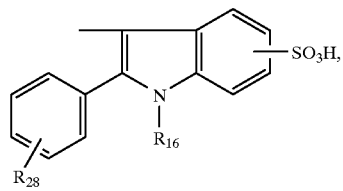

wherein $R_{16}$ is hydrogen or $C_1$–$C_4$alkyl and, preferably, hydrogen, and $R_{28}$ is hydrogen, $C_1$–$C_4$alkyl, $C_1$–$C_4$alkoxy, $C_2$–$C_4$alkanoylamino or halogen and, preferably, hydrogen;

or radicals of formula (12), wherein $R_{18}$ is hydrogen or $C_1$–$C_4$alkyl, preferably hydrogen or methyl, $R_{19}$ is hydrogen, and $R_{20}$ is hydrogen, $C_1$–$C_4$alkyl, or phenyl which is unsubstituted or substituted by $C_1$–$C_4$alkyl, $C_1$–$C_4$alkoxy, $C_2$–$C_4$alkanoylamino, ureido, halogen or sulfo and, preferably, hydrogen or $C_1$–$C_4$alkyl;

or radicals of formula (19)

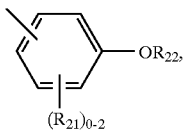

wherein $(R_{21})_{0-2}$ is 0 to 2 identical or different substituents selected from the group consisting of $C_1$–$C_4$alkyl, $C_1$–$C_4$alkoxy, $C_2$–$C_4$alkanoylamino, ureido, halogen and sulfo and, preferably, 0 to 2 identical or different substituents selected from the group consisting of $C_1$–$C_4$alkyl and $C_1$–$C_4$alkoxy, and $R_{22}$ is hydrogen or $C_1$–$C_4$alkyl;

or a radical of formula (20)

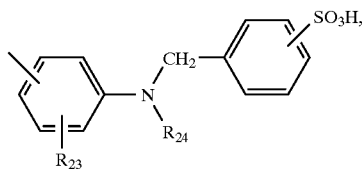

wherein $R_{23}$ is hydrogen, $C_1$–$C_4$alkyl, $C_1$–$C_4$alkoxy, $C_2$–$C_4$alkanoylamino or halogen and, preferably, hydrogen, $C_1$–$C_4$alkyl or $C_1$–$C_4$alkoxy, $R_{24}$ is hydrogen or $C_1$–$C_4$alkyl;

or radicals of formulae (21) or (22)

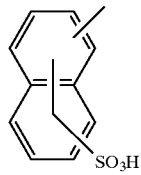

or

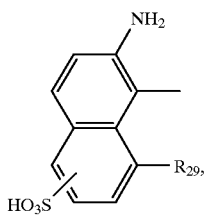

wherein $R_{29}$ is hydrogen or hydroxyl.

$A_1$, $A_2$, $A_3$ and $A_4$ are preferably radicals of a monoazo, diazo or anthraquinone dye and these radicals have the same meanings and preferred meanings cited above.

$A_1$, $A_2$, $A_3$ and $A_4$ are preferably radicals of formula (4), (5) or (6). $K_1$ and $K_2$ are here preferably radicals of formula (10), (11), (12), (13), (14) or (15), in particular radicals of formula (12), (17), (18), (19), (20), (21) or (22). $R_1$, $R_2$, $R_3$, $R_4$, $R_5$, $R_6$, $R_7$, $X_1$ and $X_2$ have the meanings and preferred meanings defined above.

$A_1$, $A_2$, $A_3$ and $A_4$ are particularly preferably radicals of formula (7), (8) or (9). $K_1$ and $K_2$ are here preferably radicals of formula (10), (11), (12), (13), (14) or (15), in particular radicals of formula (12), (17), (18), (19), (20), (21) or (22). $R_1$, $R_2$, $R_3$, $R_4$, $R_5$, $R_6$, $R_7$, $X_1$ and $X_2$ have the meanings and preferred meanings defined above.

$A_1$, $A_2$, $A_3$ and $A_4$ are very particularly preferably radicals of formula (16) or (9). $K_1$ and $K_2$ are here preferably radicals of formula (10), (1 1), (12), (13), (14) or (15), in particular radicals of formula (12), (17), (18), (19), (20), (21) or (22). $R_1$, $R_2$, $R_3$, $R_4$, $R_5$, $R_6$, $R_7$, $X_1$ and $X_2$ have the meanings and preferred meanings defined above.

Preferred dye mixtures are those, wherein $R_1$, $R_2$, $R_3$, $R_4$ and $R_6$ are each independently of one another hydrogen or $C_1$–$C_4$alkyl, $R_5$ is $C_1$–$C_6$alkyl, unsubstituted or $C_1$–$C_4$alkyl-substituted $C_5$–$C_7$cycloalkyl, or phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z, $R_7$ is $C_1$–$C_4$alkyl which is unsubstituted or substituted by halogen, hydroxyl, $C_1$–$C_4$alkoxy, carboxyl, $C_2$–$C_4$alkanoyloxy, amino or $C_2$–$C_4$alkanoylamino, or $C_2$–$C_4$alkenyl which is unsubstituted or substituted by halogen, hydroxyl or $C_1$–$C_4$alkyl, or phenyl or naphthyl which is unsubstituted or substituted by $C_1$–$C_4$alkyl, $C_1$–$C_4$alkoxy, $C_2$–$C_4$alkanoylamino, carboxyl, hydroxyl, sulfo, carbamoyl, ureido, halogen, $X_1$ and $X_2$ are each independently of the other halogen, amino; N-mono- or N,N-di-$C_1$–$C_4$-alkylamino which may be substituted in the alkyl moiety by hydroxyl, sulfo, carboxyl, $C_2$–$C_4$-alkanoylamino or $C_1$–$C_4$alkoxy, or $C_5$–$C_7$cycloalkylamino which may be substituted in the cycloalkyl ring by $C_1$–$C_4$alkyl, or phenylamino or N—$C_1$–$C_4$alkyl-N-phenylamino which may be substituted in the phenyl ring by $C_1$–$C_4$alkyl, $C_1$–$C_4$alkoxy, carboxyl, sulfo or halogen; morpholino or piperidin-1-yl, and $A_1$, $A_2$, $A_3$, $A_4$ and Z have the meanings and preferred meanings defined above.

Particularly preferred dye mixtures are those, wherein $R_1$, $R_2$, $R_3$, $R_4$ and $R_6$ are each independently of one another hydrogen or $C_1$–$C_4$alkyl, $R_5$ is phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z.

$R_7$ is a radical of formula —CHX—$CH_2$X or —CX=$CH_2$, wherein X is halogen, preferably bromo, $X_1$ and $X_2$ are each independently of the other halogen; N-mono- or N,N-di-$C_1$–$C_4$alkylamino which may be substituted in the alkyl moiety by hydroxyl; cyclohexylamino, phenylamino, morpholino or piperidin-1-yl, preferably halogen, and $A_1$, $A_2$, $A_3$, $A_4$ and Z have the meanings and preferred meanings defined above.

Very particularly preferred dye mixtures are those comprising at least one dye of formula (1) and at least one dye of formula (2), wherein $R_1$, $R_2$, $R_3$ and $R_4$ are each independently of one another hydrogen or $C_1$–$C_4$alkyl, $R_5$ is phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z, $X_1$ and $X_2$ are each independently of the other halogen; N-mono- or N,N-di-$C_1$–$C_4$alkylamino which may be substituted in the alkyl moiety by hydroxyl; cyclohexylamino, phenylamino, morpholino or piperidin-1-yl, preferably halogen, and $A_1$, $A_2$, $A_3$ and Z have the meanings and preferred meanings defined above.

$A_1$, $A_2$ and $A_3$ preferably have the same meaning, and $X_1$ and $X_2$ are identical.

The dyes of formula (1) can be obtained, for example, by reacting cyanuric halide, in particular cyanuric fluoride or, preferably cyanuric chloride, with a compound of formula (24)

$$A_1\text{—}NHR_1, \tag{24}$$

a compound of formula (25)

$$A_2\text{—}NHR_2 \tag{25}$$

and a compound of formula (26)

$$X_1\text{—}H, \tag{26}$$

wherein $A_1$, $A_2$, $X_1$, $R_1$ and $R_2$ are as defined for formula (1).

The cyanuric halide is preferably first reacted with about stoichiometric amounts of a compound of formula (24) at a temperature of −5 to 20° C., preferably of 0 to 5° C., the pH being kept in the range from neutral to slightly acid, preferably from 2 to 7, by the addition of suitable bases, typically alkali metal bases such as lithium hydroxide, sodium hydroxide or potassium hydroxide, or lithium carbonate, sodium carbonate or potassium carbonate. Conveniently about stoichiometric amounts of a compound of formula (25) are added to the reaction mixture so obtained and are then reacted with the triazine derivative at slightly elevated temperature, preferably from 10 to 60° C., and at a neutral to slightly acid pH of preferably 6 to 7. If the compounds of formulae (24) and (25) are identical compounds where $A_1$=$A_2$ and $R_1$=$R_2$, then about 2 equivalents of a compound of formula (24) are reacted with 1 equivalent of cyanuric chloride or cyanuric fluoride, the temperature preferably being at first kept at −5 to 20° C., preferably at 0 to 5° C., and is then preferably raised to 10 to 60° C.

It is also possible to react cyanuric halide first with a precursor of the compound of formula (24), for example with a diazo component in the case of azo dyes, and to react it then to the corresponding dye radical $A_1$, for example by diazotisation and coupling. This reaction to the dye radical can be carried out e.g. preferably directly after the reaction of cyanuric halide with the precursor, or also in the further course of the synthesis of the dye of formula (1).

The triazinyl compounds obtainable by the process described above additionally contain a halogen atom which can be converted to a group $X_1$ by reacting it with a compound of formula (26) at elevated temperature, preferably in the range from 20 to 70° C., and at a neutral to slightly alkaline pH which, depending on the compound of formula (26), ranges from 7 to 9. The compound of formula (26) is preferably used in excess.

The dyes of formula (2) can be obtained by a procedure analogous to that used in preparing the dyes of formula (1), for example by reacting cyanuric halide, in particular cyanuric fluoride or, preferably, cyanuric chloride, with a compound of formula (27)

$$A_3\text{—}NHR_3, \tag{27}$$

a compound of formula (28)

$$R_5\text{—}NHR_4, \tag{28}$$

and a compound of formula (29)

$$X_2\text{—}H, \tag{29}$$

wherein $A_3$, $R_3$, $R_4$, $R_5$ and $X_2$ are as defined for formula (2).

The dyes of formula (3) can be obtained, for example, by reacting a compound of formula (30)

$$A_4\text{—}NHR_6 \tag{30}$$

with a compound of formula (31)

$$hal\text{—}CO\text{—}R_7, \tag{31}$$

wherein hal is halogen, preferably bromo or chloro, and $A_4$, $R_6$ and $R_7$ are as defined for formula (3).

The reaction with compounds of the above formula (31) can generally be carried out in dipolar aprotic solvents, typically dimethylformamide, dimethylsulfoxide or N-methylpyrrolidone, in the presence of a base, typically an alkali metal carbonate or alkali metal hydroxide, for example sodium carbonate, potassium carbonate or sodium hydroxide, at a temperature of e.g. 0 to 80° C.

The compounds used in the above processes are known or can be prepared in general analogy to known compounds.

The dye mixtures of the dyes of formulae (1), (2) and (3) can also be prepared, for example, by mixing the individual dyes. This mixing process is typically carried out in suitable mills, e.g. bead and pin mills, as well as in kneaders or mixers.

The dye mixtures can also be prepared, for example, by spray drying the aqueous dye mixtures.

The dye mixtures preferably comprise 5 to 95% by weight, in particular 10 to 90% by weight and, preferably, 20 to 80% by weight, of a dye of formula (1), based on the total amount of the dyes of formulae (1) and (2) or based on the total amount of the dyes of formulae (1) and (3). The dye mixtures particularly preferably comprise 30 to 70% by weight, more particularly 35 to 65% by weight, of a dye of formula (1), based on the total amount of the dyes of formulae (1) and (2) or based on the total amount of the dyes of formulae (1) and (3).

The dyes of formulae (1), (2) and (3) are present either in the form of their free acid or, preferably, as the salts thereof.

Suitable salts are, for example, the alkali metal, alkaline earth metal or ammonium salts or the salts of an organic amine. Typical examples are the sodium, lithium, potassium or ammonium salts or the salt of the mono-, di- or triethanolamine.

The term sulfo generally includes the free acid form (—$SO_3H$) and also the salt form.

The dyes of formulae (1), (2) and (3) are anionic acid dyes. In the dyes of formulae (1), (2) and (3), the number of anionic groups, in particular the number of sulfo groups, is greater than or equal to the number of cationic groups. Preferably, the number of anionic groups is greater than the number of cationic groups. Cationic groups are to be understood as meaning those groups which carry a cationic charge under customary dyeing conditions. Examples are aliphatically bonded amino radicals. The nitrogen atoms present in the triazine ring and those bonded to the triazine radical carry no cationic charge.

The dye mixtures according to the invention are suitable, by methods known per se, for dyeing and printing, in particular, nitrogen- or hydroxyl-containing fibre materials, paper or leather, typically textile fibre materials of cellulose, silk and, in particular, wool and synthetic polyamides. It is preferred to dye or print natural or synthetic polyamide fibre materials. The novel dye mixtures can be used for dyeing and printing in the generally customary form, which may be worked up beforehand, if appropriate. Level dyeings are obtained having good allround fastness properties, in particular good fastness to rubbing, wet treatment, wet rubbing and light. The novel dye mixtures are furthermore readily water-soluble and can easily be combined with other dyes. The above-mentioned textile material can be in any form of presentation, for example in the form of fibre, yarn, woven fabric or knitted fabrics.

The following Examples illustrate the invention in more detail. Temperatures are given in degrees Celsius, parts and percentages are by weight, unless otherwise stated. Parts by weight and parts by volume have the same relationship as that of the kilogramme to the litre.

WORKING EXAMPLE 1

19.1 Parts of 1,3-phenylendiamine-4-sulfonic acid (98.6%) are dissolved in 100 parts of water and 52 parts of an aqueous 2 N sodium hydroxide solution at pH 7, and this mixture is added dropwise to a mixture consisting of 18.5 parts of cyanuric chloride, 100 parts of ice and 50 parts of water at a temperature of 5° C. over 50 minutes. During this dropwise addition, the pH is kept at 3 to 3.5. The pH is then increased to 7 by adding 50 parts of an aqueous 2 N sodium hydroxide solution over 70 minutes. After one hour, 25 parts of hydrochloric acid (37%) and 200 parts of water are added, and 25 parts of an aqueous 4 molar sodium nitrite solution are then metered in at a temperature of 5 to 15° C. over 25 minutes. After two hours, excess sodium nitrite is destroyed with sulfamic acid. Meanwhile, 22.5 parts of 2-naphthylamine-5-sulfonic acid are dissolved in 100 parts of water and 52 parts of an aqueous 2 N sodium hydroxide solution at pH 7, and this solution is then added dropwise to the reaction mixture over 30 minutes. The pH is then adjusted to 7 by adding 112 parts of an aqueous 2 N sodium hydroxide solution over 80 minutes. A solution of 12.2 parts of N-ethylaniline in 100 parts of 1 molar hydrochloric acid is then added dropwise over 15 minutes, followed by the addition of 101 parts of an aqueous 2 N sodium hydroxide solution over 50 minutes. The dark red reaction solution is charged with 500 parts of an aqueous sodium chloride solution, and the precipitated product is then filtered off, washed with 10% aqueous sodium chloride solution and dried under vacuum at 70° C., giving 52.5 parts of a compound of formula

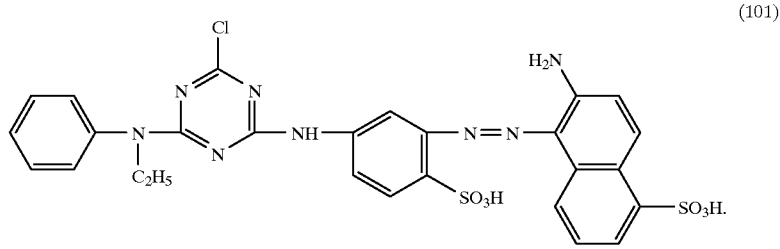

(101)

WORKING EXAMPLES 2 TO 11

In general analogy to the instructions of Working Example 1, those dyes may be obtained which are listed in the following Table 1 in the form of the free acids.

TABLE 1
Working Example
2 (102)
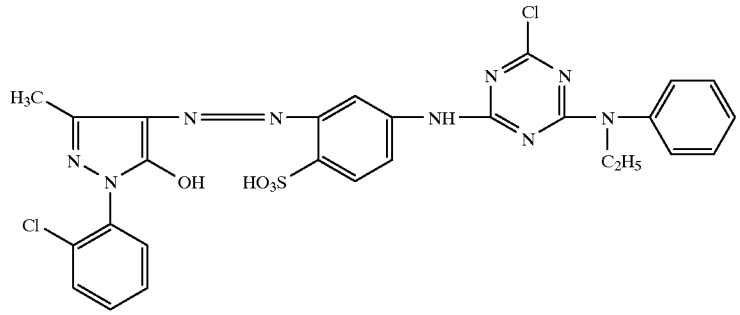
3 (103)
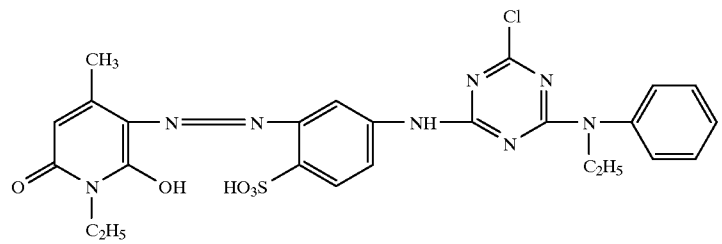
4 (104)
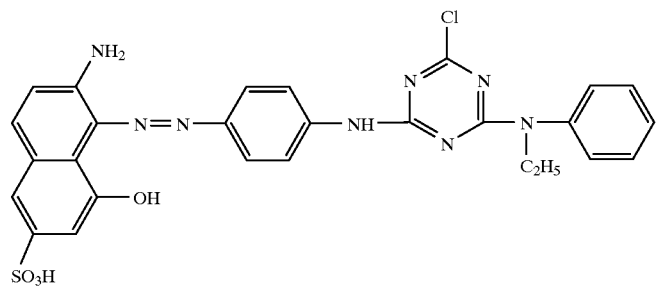
5 (105)
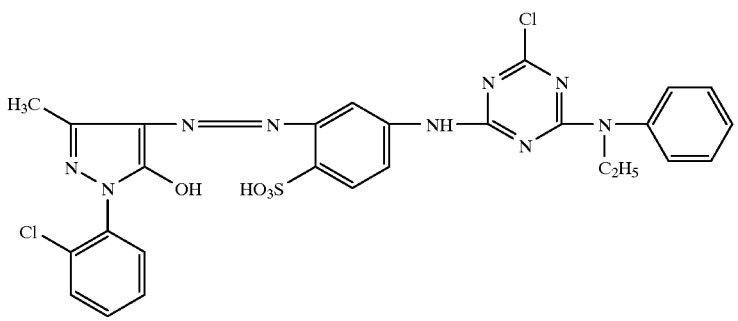
6 (106)
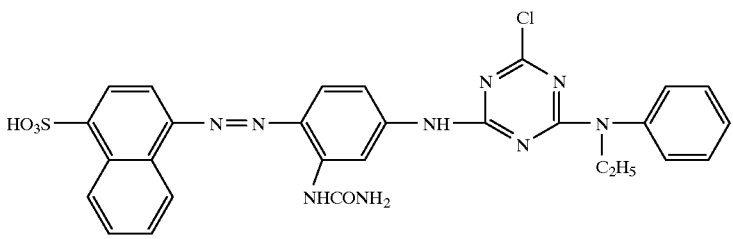

TABLE 1-continued
Working Example
7 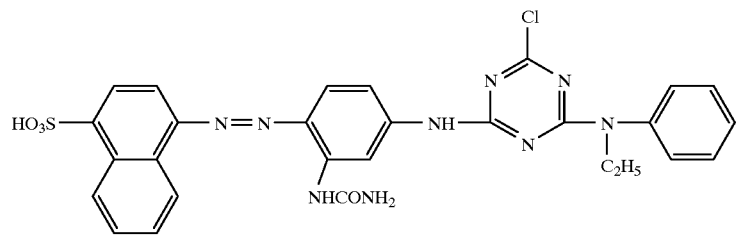 (107)
8 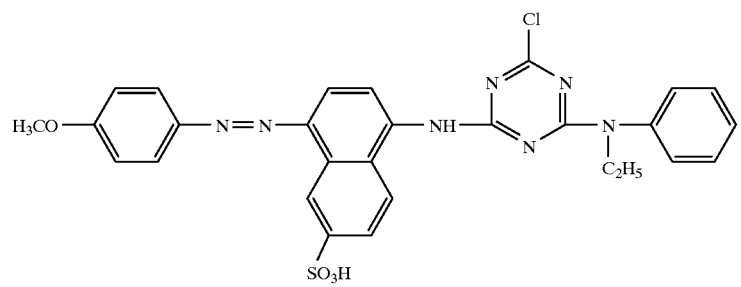 (108)
9 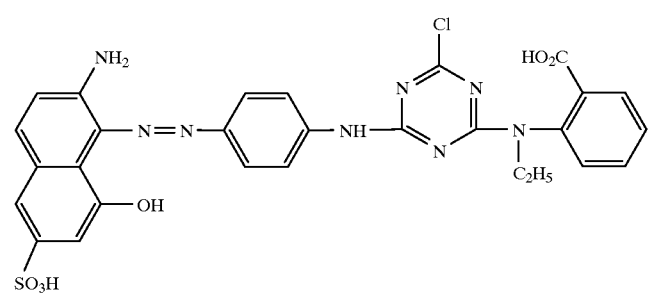 (109)
10 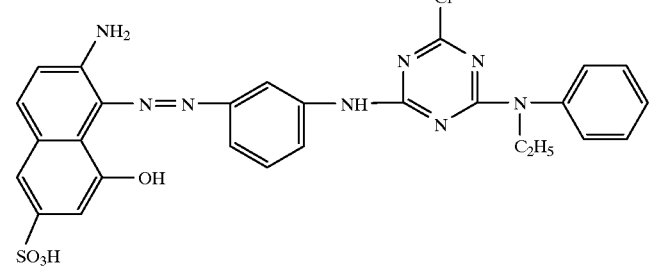 (110)
11 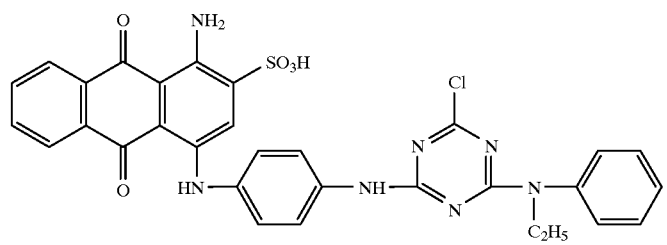 (111)

In contradistinction to the azo dyes of formulae (101) to (110), the anthraquinone dye of formula (111) is obtained by first condensing the compound of formula (112)

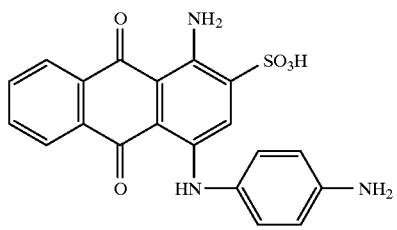
(112)

with cyanuric chloride and then reacting the resulting condensate with N-ethylaniline in general accordance with the procedure described in Working Example 1.

WORKING EXAMPLE 12

70 parts of cyanuric chloride are stirred for 30 minutes in 950 parts of ice and 200 parts of water, with the addition of 3.6 parts of disodium dihydrogen phosphate×12 H$_2$O. To

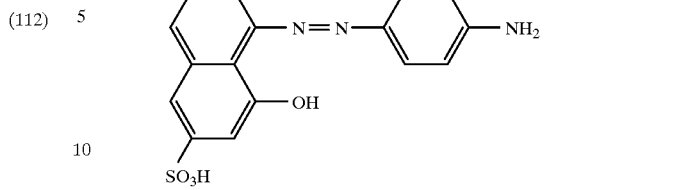
(114)

in 150 parts of water. The pH is adjusted to 6 and the reaction mixture is then heated to 35° C., the pH being kept at 6 by addition of 2 N sodium hydroxide solution. After 2 hours, the uptake of sodium hydroxide solution is complete. Sodium chloride (c. 20 vol. %, based on the reaction mixture) is added, and the precipitated product is then collected by suction filtration and washed with a small amount of an aqueous solution of sodium chloride. After drying at 35° C. under vacuum, a dye is obtained which, in the form of the free acid, corresponds to the compound of formula (115).

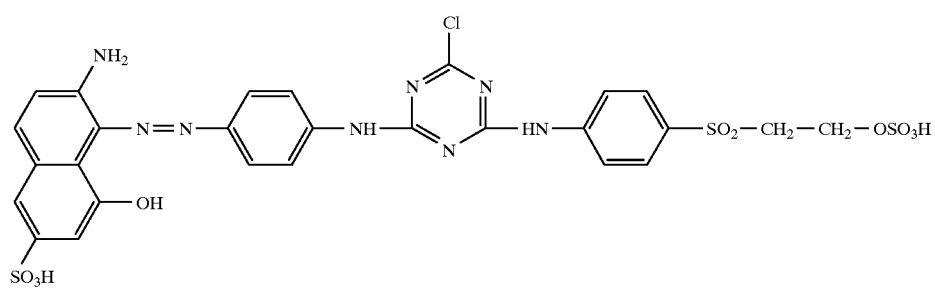
(115)

this mixture is added over 10 minutes a solution consisting of 116.4 parts of 4-(β-sulfatoethylsulfonyl)aniline (92%) in 900 parts of water and which is adjusted to pH 5.5. Throughout this addition, the pH is kept at 4.5 to 5 by addition of 2 N sodium hydroxide solution. Subsequently, 500 parts of acetone are added and the mixture is stirred at 0 to 5° C. until the uptake of sodium hydroxide solution is complete. The precipitate is then collected by suction filtration and washed first with water and then with acetone. The precipitate so obtained is dried at room temperature under vacuum, giving a compound which, in the form of the free acid, corresponds to formula (113).

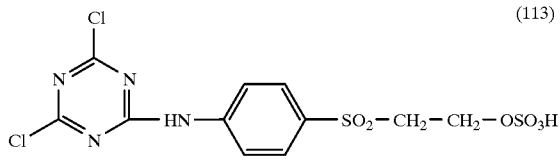
(113)

20 Parts of the compound of formula (113) are suspended in 150 parts of water and then slowly added to a suspension containing 24.8 parts of the compound of formula (114) in the form of the free acid

WORKING EXAMPLE 13

1.85 Parts of cyanuric chloride are ground in 25 parts of ice, 5 parts of water and 0.1 parts of disodium hydrogen phosphate for 30 minutes, while cooling with ice.

To prepare a second solution, 7.16 parts of the compound of formula (114) are dissolved in 160 parts of water at a temperature of 25 to 30° C. and a pH of 8.5 to 9. The resulting solution of the compound of formula (114) is added dropwise to the cyanuric chloride slurry obtained as described above. The mixture is then heated slowly to a temperature of 45 to 50° C. and the pH is increased to 9 by addition of aqueous sodium hydroxide solution. The reaction mixture is subsequently diluted with ethanol and then filtered. After washing with an ethanol/water mixture (in the ratio of 1:1), the dye is dried at a temperature of 50 to 60° C. under vacuum, giving 5.4 parts of a dye which, in the form of the free acid, corresponds to the compound of formula (116).

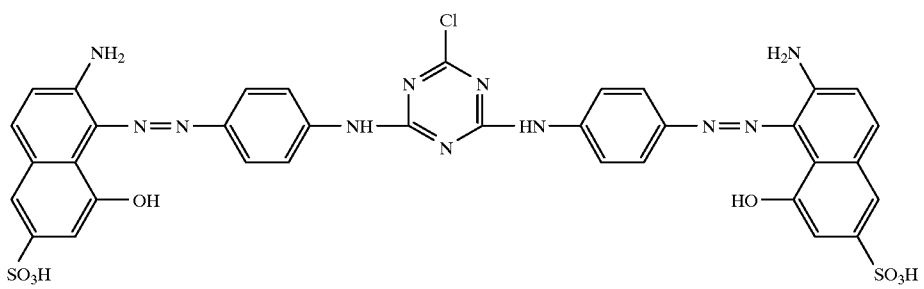
(116)

WORKING EXAMPLES 14 TO 20

In general analogy to the instructions of Working Example 13, those dyes listed in the following Table 2 in the form of the free acids may be obtained.

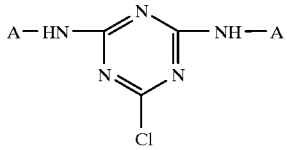

TABLE 2

| Example | A |
|---|---|
| 14 | (117) |
| 15 | (118) |
| 16 | (119) |

TABLE 2-continued

| Example | A |
|---|---|
| 17 | 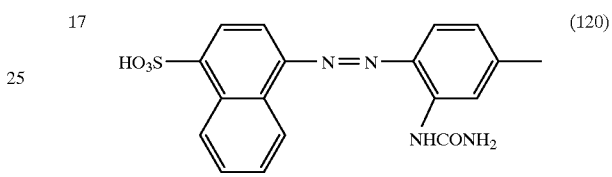 (120) |
| 18 | 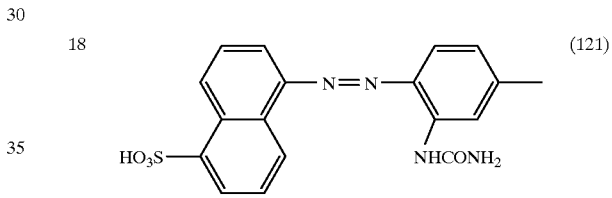 (121) |
| 19 | 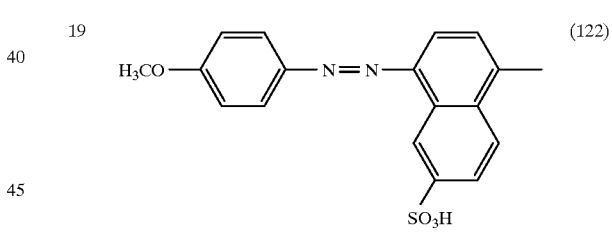 (122) |
| 20 | 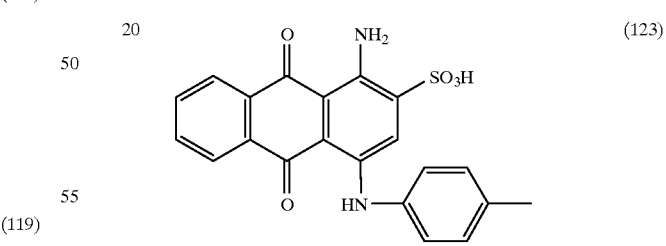 (123) |

In contradistinction to the azo dyes of formulae (116) to (122), the anthraquinone dye of formula (123) is obtained by condensing the compound of formula (112) with cyanuric chloride, in general accordance with the procedure described in Working Example 13.

The dye of formula (124)

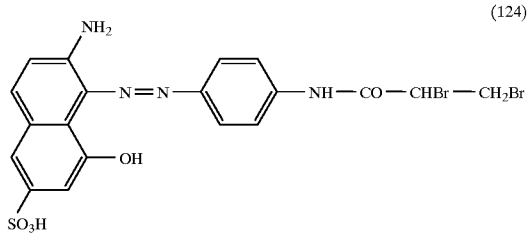

may be obtained by reacting e.g. 2,3-dibromopropionylchloride in known manner with the dye of formula (114) in the presence of a base.

EXAMPLES OF DYE MIXTURES

By mixing in a mixer, 100 parts each of the dye mixtures of the following Table 3 are prepared, which dye wool and synthetic polyamide fibre materials in the indicated shades.

TABLE 3

| Ex. | Dye mixture | Shade on wool |
|---|---|---|
| 21 | mixture of | |
| | 65 parts of the dye according to Working Example 4 | red |
| | 35 parts of the dye according to Example 13 | |
| 22 | mixture of | |
| | 50 parts of the dye according to Working Example 4 | red |
| | 50 parts of the dye according to Example 13 | |
| 23 | mixture of | |
| | 50 parts of the dye according to Working Example 8 | yellow |
| | 50 parts of the dye according to Example 19 | |
| 24 | mixture of | |
| | 50 parts of the dye according to Working Example 6 | orange |
| | 50 parts of the dye according to Example 17 | |
| 25 | mixture of | |
| | 50 parts of the dye according to Working Example 5 | red |
| | 50 parts of the dye according to Example 16 | |
| 26 | mixture of | |
| | 50 parts of the dye according to Working Example 3 | yellow |
| | 50 parts of the dye according to Example 15 | |
| 27 | mixture of | |
| | 50 parts of the dye according to Working Example 2 | yellow |
| | 50 parts of the dye according to Example 14 | |
| 28 | mixture of | |
| | 50 parts of the dye according to Working Example 11 | blue |
| | 50 parts of the dye according to Example 20 | |
| 29 | mixture of | |
| | 50 parts of the dye according to Working Example 9 | red |
| | 50 parts of the dye according to Example 13 | |
| 30 | mixture of | |
| | 50 parts of the dye according to Working Example 10 | red |
| | 50 parts of the dye according to Example 13 | |
| 31 | mixture of | |
| | 50 parts of the dye according to Working Example 7 | orange |
| | 50 parts of the dye according to Example 18 | |
| 32 | mixture of | |
| | 50 parts of the dye of formula (124) | red |
| | 50 parts of the dye according to Example 13 | |

TABLE 3-continued

| Ex. | Dye mixture | Shade on wool |
|---|---|---|
| 33 | mixture of | |
| | 65 parts of the dye of formula (124) | red |
| | 35 parts of the dye according to Example 13 | |
| 34 | mixture of | |
| | 50 parts of the dye according to Working Example 12 | red |
| | 50 parts of the dye according to Example 13 | |

EXAMPLES OF DYEINGS

Example 35

10 Parts of polyamide 6.6 fibre material (Helanca tricot) are dyed in 500 parts of an aqueous liquor which comprises 2 g/l of ammonium acetate and which is adjusted to pH 5 with acetic acid. The content of the dye mixture of Example 22 is 0.8%, based on the fibre weight. The dyeing time at a temperature of 98° C. is 30 to 90 minutes. The dyed fibre material is then removed from the liquor and washed and dried in the customary manner, giving a piece of fabric which has been dyed red and having good overall fastness properties.

Example 36

10 Parts of woolen knitting yarn are stirred at 30° C. into a dye bath which comprises 0.8 parts of the dye of Example 21, 0.5 parts of sodium sulfate and 2 parts of sodium acetate, per 100 parts of water, and which is adjusted to pH 4.5 with acetic acid (80%). The liquor is brought to the boiling point over 45 minutes and is kept there for a further 45 to 70 minutes. The dyed goods are then removed, rinsed thoroughly with cold water and dried, giving a red dyeing on wool which has good fastness properties.

Example 37

100 Parts of clothing suede leather are milled at 50° C. in a solution of 1000 parts of water and 2 parts of 24% ammonia for 2 hours and then dyed for one hour at 60° C. in a solution of 1000 parts of water, 2 parts of 24% ammonia and 2 parts of a dye mixture of Example 21. Thereafter, a solution of 40 parts of water and 4 parts of 85% formic acid is added and dyeing is carried out for a further 30 minutes. The leathers are then rinsed thouroughly and, if appropriate, further treated with 2 parts of a dicyandiamide/formaldehyde condensate at 50° C. for 30 minutes, giving a red dyeing having good overall fastness properties.

What is claimed is:

1. A dye mixture comprising at least one anionic acid dye of formula (1)

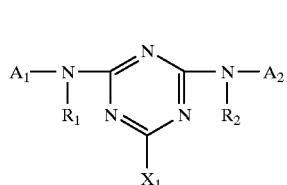

and at least one anionic acid dye of formula (2)

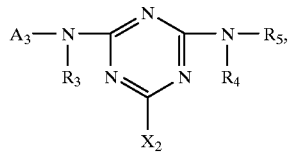
(2)

wherein $R_1$, $R_2$, $R_3$ and $R_4$ are each independently of one another hydrogen or $C_1$–$C_4$alkyl, $R_5$ is phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z, or the radical of formula —$N(R_4)$—$R_5$ is a ring which may contain further hetero atoms, wherein Z is a group of formula —CH=$CH_2$ or —$CH_2$—$CH_2$—Y, and Y is a leaving group, $X_1$ and $X_2$ are identical and are halogen; N-mono- or N,N-di-$C_1$–$C_4$alkylamino which may be substituted in the alkyl moiety by hydroxyl; cyclohexylamino, phenylamino, morpholino or piperidin-1-yl, and $A_1$, $A_2$ and $A_3$ have the same meaning and are radicals of formula (16)

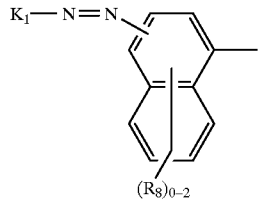
(16)

or

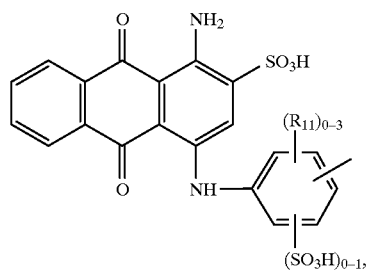
(9)

wherein $(R_8)_{0-2}$ is 0 to 2 identical or different substituents selected from the group consisting of $C_1$–$C_4$alkyl, $C_1$–$C_4$alkoxy, $C_2C_4$alkanoylamino, ureido and sulfo, $(R_{11})_{0-3}$ are 0 to 3 identical or different substituents selected from the group consisting of $C_1$–$C_4$alkyl, $C_1$–$C_4$alkoxy and halogen, and $K_1$ is a radical of formula (17)

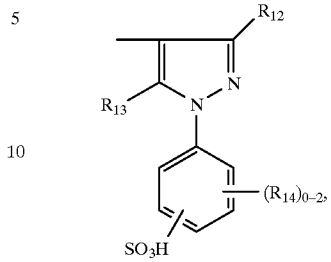
(17)

wherein $R_{12}$ is methyl or carboxyl, $R_{13}$ is amino or hydroxyl, and $(R_{14})_{0-2}$ is 0 to 2 identical or different substituents selected from the group consisting of $C_1$–$C_4$alkyl, $C_1$–$C_4$alkoxy, $C_2$–$C_4$alkanoylamino, ureido, halogen and sulfo;

or a radical of formula (18)

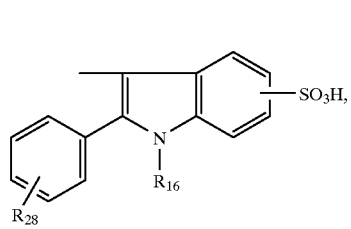
(18)

wherein $R_{16}$ is hydrogen or $C_1$–$C_4$alkyl, and $R_{28}$ is hydrogen, $C_1$–$C_4$alkyl, $C_1$–$C_4$alkoxy, $C_2$–$C_4$alkanoylamino or halogen;

or a radical of formula (12),

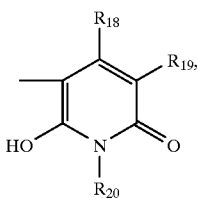
(12)

wherein $R_{18}$ is hydrogen or $C_1$–$C_4$alkyl, $R_{19}$ is hydrogen, and $R_{20}$ is hydrogen, $C_1$–$C_4$alkyl, or phenyl which is unsubstituted or substituted by $C_1$–$C_4$alkyl, $C_1$–$C_4$alkoxy, $C_2$–$C_4$alkanoylamino, ureido, halogen or sulfo;

or a radical of formula (19)

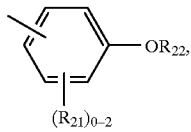
(19)

wherein $(R_{21})_{0-2}$ is 0 to 2 identical or different substituents selected from the group consisting of $C_1$–$C_4$alkyl, $C_1$–$C_4$alkoxy, $C_2$–$C_4$alkanoylamino, ureido, halogen and sulfo, and $R_{22}$ is hydrogen or $C_1$–$C_4$alkyl;

or a radical of formula (20)

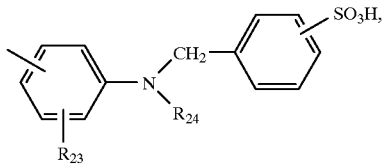
(20)

wherein $R_{23}$ is hydrogen, $C_1$–$C_4$alkyl, $C_1$–$C_4$alkoxy, $C_2$–$C_4$alkanoylamino or halogen, and $R_{24}$ is hydrogen or $C_1$–$C_4$alkyl;

or radicals of formulae (21) or (22)

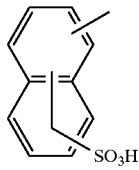
(21)

or

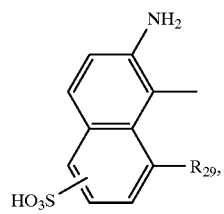
(22)

wherein $R_{29}$ is hydrogen or hydroxyl.

2. A process for dyeing or printing hydroxyl group-containing or nitrogen-containing fibre material, which process comprises applying to said fibre material a tinctorial amount of a dye mixture according to claim 1.

3. A dye mixture according to claim 1, wherein Y is a group of formula —$OSO_3H$.

4. A process according to claim 2, wherein said fibre material is natural or synthetic polyamide fibre material.

5. A dye mixture according to claim 1, wherein $R_5$ is phenyl which is unsubstituted or substituted by $C_1$–$C_4$alkyl, $C_1$–$C_4$alkoxy, $C_2$–$C_4$alkanoylamino, carboxyl, sulfo, carbamoyl, ureido, halogen or by a radical of formula —$SO_2$—Z.

6. A dye mixture according to claim 1, wherein $R_5$ is phenyl which is unsubstituted or substituted by sulfo or carboxyl.

7. A dye mixture according to claim 1, wherein $X_1$ and $X_2$ are chloro.

* * * * *

UNITED STATES PATENT AND TRADEMARK OFFICE
CERTIFICATE OF CORRECTION

PATENT NO. : 5,958,086
DATED : September 28, 1999
INVENTOR(S) : Jean-Marie Adam, et. al.

It is certified that error appears in the above-identified patent and that said Letters Patent is hereby corrected as shown below:

Title page, item [30] should read:

[30]    Foreign Application Priority Data
      Aug. 26, 1996    [CH]    Switzerland    2087/96 --.

Signed and Sealed this

Second Day of May, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,958,086
DATED : SEPTEMBER 28, 1999
INVENTOR(S) : Jean-Marie Adam et al It is certified that error appears in the above-indentified patent and that said Letters Patent is hereby corrected as shown below:

Column 6, line 11 should read:

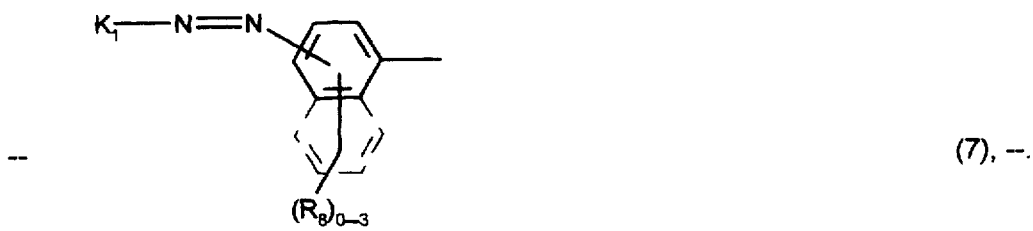

-- (7), --.

Column 6, line 21 should read:

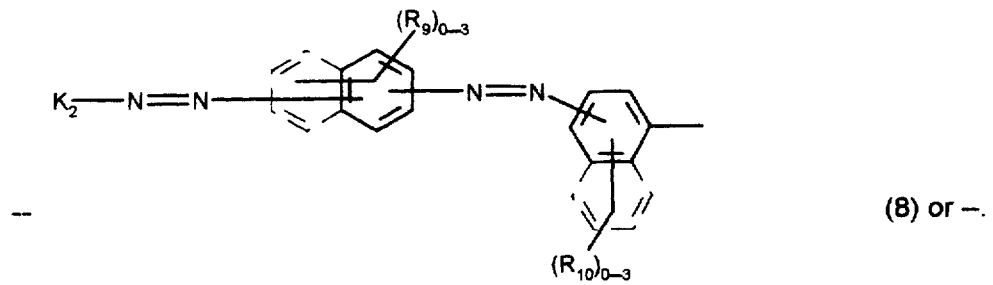

-- (8) or --.

UNITED STATES PATENT AND TRADEMARK OFFICE
CERTIFICATE OF CORRECTION

PATENT NO. : 5,958,086
DATED : SEPTEMBER 28, 1999
INVENTOR(S) : Jean-Marie Adam et al It is certified that error appears in the above-indentified patent and that said Letters Patent is hereby corrected as shown below:

Column 9, line 1 should read:

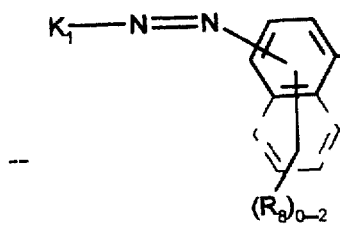

(16), --.

Column 25, line 36 should read:

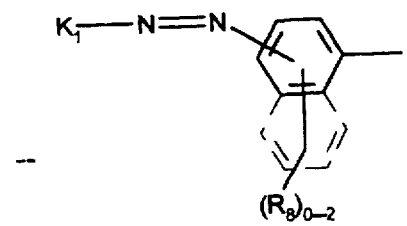

(16), --.

Signed and Sealed this

Thirteenth Day of March, 2001

*Attest:*

NICHOLAS P. GODICI

*Attesting Officer*   *Acting Director of the United States Patent and Trademark Office*